US010986596B2

(12) United States Patent
Mackenzie et al.

(10) Patent No.: US 10,986,596 B2
(45) Date of Patent: Apr. 20, 2021

(54) BASE STATION, AND A METHOD OF OPERATING A BASE STATION, IN A CELLULAR TELECOMMUNICATIONS NETWORK

(71) Applicant: British Telecommunications Public Limited Company, London (GB)

(72) Inventors: Richard Thomas Mackenzie, London (GB); Michael Robert Fitch, London (GB); Anvar Tukmanov, London (GB)

(73) Assignee: British Telecommunications Public Limited Company, London (GB)

( * ) Notice: Subject to any disclaimer, the term of this patent is extended or adjusted under 35 U.S.C. 154(b) by 189 days.

(21) Appl. No.: 16/067,402

(22) PCT Filed: Dec. 22, 2016

(86) PCT No.: PCT/EP2016/082358
§ 371 (c)(1),
(2) Date: Jun. 29, 2018

(87) PCT Pub. No.: WO2017/121606
PCT Pub. Date: Jul. 20, 2017

(65) Prior Publication Data
US 2019/0028983 A1 Jan. 24, 2019

(30) Foreign Application Priority Data
Jan. 14, 2016 (EP) .................................... 16151207

(51) Int. Cl.
*H04W 72/04* (2009.01)
*H04W 56/00* (2009.01)
(Continued)

(52) U.S. Cl.
CPC ........ *H04W 56/001* (2013.01); *H04B 1/0475* (2013.01); *H04W 72/0446* (2013.01); *H04W 76/11* (2018.02)

(58) Field of Classification Search
None
See application file for complete search history.

(56) References Cited

U.S. PATENT DOCUMENTS

| 9,538,369 B2 * | 1/2017 | Garcia | ............... H04W 8/26 |
| 2003/0147362 A1 * | 8/2003 | Dick | ............... H04B 7/2687 370/324 |

(Continued)

FOREIGN PATENT DOCUMENTS

| CN | 1318231 A | 10/2001 |
| CN | 101932140 A | 12/2010 |

(Continued)

OTHER PUBLICATIONS

International Search Report and Written Opinion for corresponding International Application No. PCT/EP2016/082358 dated May 9, 2017; 12 pages.

(Continued)

*Primary Examiner* — Sithu Ko
(74) *Attorney, Agent, or Firm* — Patterson Thuente Pedersen, P.A.

(57) ABSTRACT

This disclosure provides a base station for a cellular network, and a method of operating the base station in the cellular network, the cellular network also including a second base station, wherein the first and second base stations include first and second oscillators providing a first and second periodic timing pulse respectively, the method including determining a relative timing offset between a first instance of the first periodic timing pulse for transmission of a frame from the first base station and a first instance of the second periodic timing pulse for transmission of a frame (Continued)

from the second base station; determining that the relative timing offset is changeable; and adjusting the first periodic timing pulse to maintain the relative timing offset by varying a first period between instances of the first periodic timing pulse such that the rate of change of the relative timing offset over time is reduced.

13 Claims, 5 Drawing Sheets

(51) Int. Cl.
  *H04W 76/11* (2018.01)
  *H04B 1/04* (2006.01)

(56) References Cited

U.S. PATENT DOCUMENTS

| | | | |
|---|---|---|---|
| 2010/0054237 A1* | 3/2010 | Han | H04J 3/0638 370/350 |
| 2010/0208720 A1* | 8/2010 | Fujishima | H04W 56/0015 370/350 |
| 2011/0176483 A1* | 7/2011 | Palanki | H04W 56/0015 370/328 |
| 2011/0274097 A1* | 11/2011 | Zhang | H04W 24/02 370/338 |
| 2013/0328868 A1 | 10/2013 | Morioka | |
| 2013/0294425 A1 | 11/2013 | Song et al. | |
| 2015/0155996 A1 | 6/2015 | Garcia | |
| 2015/0304932 A1* | 10/2015 | Wei | H04J 11/0069 370/331 |
| 2018/0262922 A1 | 9/2018 | Mackenzie et al. | |

FOREIGN PATENT DOCUMENTS

| | | |
|---|---|---|
| CN | 101938701 A | 1/2011 |
| CN | 102548001 A | 7/2012 |
| CN | 103314611 | 9/2013 |
| CN | 103457685 | 12/2013 |
| EP | 0 881 785 A1 | 12/1998 |
| EP | 2 642 782 A1 | 9/2013 |
| GB | 2 473 978 A | 2/2010 |
| WO | WO 98/09469 | 3/1998 |
| WO | WO 2014/071562 A1 | 5/2014 |

OTHER PUBLICATIONS

International Preliminary Report on Patentability for corresponding International Application No. PCT/EP2016/082358 dated Dec. 15, 2017; 6 pages.
European Search Report for EP Application No. 16151207.4 dated Jul. 18, 2016; 7 pages.
GB Examination Report for GB Application No. 1600676.9 dated Oct. 27, 2017; 2 pages.
GB Search Report for GB Application No. 1600676.9 dated Jun. 20, 2016; 2 pages.
Qualcomm Technologies, Inc., "LTE Small Cell SON Test Cases Funtionality and Interworking"; Jun. 5, 2015; 82 pages. Qualcomm Technologies, Inc. San Diego, CA U.S.A.
Bhat, et al.; Radisys; White Paper "CPE WAN & FAP Management Protocols" 9 pages; Hillsboro, OR USA (Sep. 2011).
English Translation of Chinese Office Action and Search Report, Application No. 201680078951.8, dated Jun. 19, 2020, 9 pages.

* cited by examiner

BASE STATION, AND A METHOD OF OPERATING A BASE STATION, IN A CELLULAR TELECOMMUNICATIONS NETWORK

CROSS-REFERENCE TO RELATED APPLICATION

The present application is a National Phase entry of PCT Application No. PCT/EP2016/082358, filed Dec. 22, 2016, which claims priority from EP Patent Application No. 16151207.4, filed Jan. 14, 2016, each of which is hereby fully incorporated herein by reference.

FIELD OF THE INVENTION

The present disclosure relates to a cellular communications network.

BACKGROUND

A base station in a cellular communications network is assigned both a Cell Global Identifier (CGI, known as eCGI in the $4^{th}$ Generation (4G) Long Term Evolution (LTE) protocol) and a Physical Cell Identifier (PCI). The eCGI is an identifier used to uniquely identify the base station from any other base station in the world. The PCI is also used to identify a base station, but has the drawback that the 504 available PCIs are shared among base stations, such that PCI reuse has to occur and may result in PCIs being reused between base stations in close proximity to each other. Nonetheless, there are a few advantages to using the PCI, rather than the eCGI, for several processes in cellular networks. For example, the PCI is derived from reference signals and therefore User Equipment (UE) may decode the PCI in a relatively short time (around 20 ms for the PCI compared to around 160 ms for the eCGI). Furthermore, while scanning for neighboring base stations, the UE cannot transmit or receive data with its serving base station, so decoding the PCI rather than eCGI increases data throughput. The UE may also experience increased levels of service disruption by using the eCGI, for example if the UE is unable to decode the identifier in time for a successful handover, so the use of the PCI reduces this risk. Furthermore, the extra processing requirements to decode the eCGI places further demands on the battery of UEs. This last problem is particularly relevant for distributed cellular networks, such as femtocell networks, in which the UE needs to decode the identifiers on a more frequent basis.

A femtocell, also known as a Home evolved Node B (HeNB), is one of a class of base stations known as small cells, which further includes picocells, metrocells and microcells depending on the coverage area. It is intended to deploy HeNBs such that there is a much higher density of HeNBs compared to base stations of conventional cellular networks. This has the advantages of increased coverage and capacity for the cellular network. However, the limited number of PCI values and the likely self-organized nature of the femtocell means that such a deployment will result in PCI conflicts. A PCI conflict occurs when either a base station has a neighbor base station with the same PCI (a PCI collision) or when a base station has two neighbors having the same PCI (a PCI confusion). Both these forms of PCI conflict cause issues in the network. For example, if there is a PCI collision, then any UE connected to the serving base station can mistake transmissions of the conflicting base station with its own serving base station. This can cause various issues such as incorrect channel estimation, which can lead to an unstable connection and reduced data throughput. Furthermore, if there is a PCI confusion, the serving base station may not be able to command a UE to handover to one of the two base stations having the same PCI. If the serving base station is aware of the confusion then it can request the eCGI to distinguish between the two base stations and thus complete the handover. However, requesting the eCGI adds additional signaling and delays to mobility management.

Furthermore, two base stations having different PCI values can also experience performance issues. For example, when two base stations are time synchronized and have different PCIs but, nonetheless, have the same "mod 3" value, then cell specific reference signals would be transmitted in the same pattern, at the same time and with the same frequency resources. This can affect how a UE measures and reports the channel between each cell so can significantly reduce performance.

Much of the research in this area relates to developing PCI allocation algorithms that minimize the chances of a PCI collision. However, if this is not possible in a particular deployment scenario, then a PCI collision will exist in the cellular network. If the two base stations having colliding PCIs are synchronized (i.e. transmissions by the first and second base station are aligned such that the start of each frame in the transmission are transmitted at the same time instance), then this will cause severe interference issues. In this case, the network operator must decide whether to allow the base stations to continue operating, at the expense of network performance, or switch one of the base stations off.

It is also possible for the two base stations having colliding PCIs to be non-synchronized. This may be realized in several forms. Firstly, the start of a frame from the first base station may have a time offset relative to the start of a frame from the second base station, and that time offset doesn't change relative to subsequently transmitted frames. In this case, the two periodic timing pulses governing when frames are transmitted from the two base stations have the same periodicity, but any two timing pulses from the respective base stations do not occur at the same time instance. As any two frames transmitted by the first and second base stations are not synchronized, such that there is no overlap in the reference signals in the time and frequency domains, then interference is much lower than the scenario above in which the two base stations having a colliding PCI are synchronized (or the interference may even be negligible).

Secondly, the two non-synchronized base stations may have a relative clock drift. In this case, the start of a frame from the first base station has a changing time offset relative to the start of a frame from the second base station, and that time offset varies between 0 ms and x ms (where x typically represents half the time period of a frame) across several transmitted frames. The two base stations are periodically synchronized when the time offset between the two frames is 0 ms. In this case, there are periods in which the two base stations are not synchronized and the interference is relatively low (compared to the scenario in which the two base stations are synchronized) and periods in which the two base stations are transiently synchronized and there is a brief spike in interference levels.

It is desirable to alleviate some or all of the above problems.

SUMMARY

According to a first aspect of the disclosure, there is provided a method of operating a first base station in a cellular network, the cellular network also including a second base station, wherein the first and second base stations include first and second oscillators providing a first and second periodic timing pulse respectively, the method comprising: determining a relative timing offset between a first instance of the first periodic timing pulse for transmission of a frame from the first base station and a first instance of the second periodic timing pulse for transmission of a frame from the second base station; determining that the relative timing offset is changeable; and adjusting the first periodic timing pulse to maintain the relative timing offset by varying a first period between instances of the first periodic timing pulse such that the rate of change of the relative timing offset over time is reduced.

In embodiments of the present disclosure, a base station is able to determine whether a relative timing offset between its periodic timing pulse and that of a neighboring base station is changeable. If so, the base station may then adjust a period of its periodic timing pulse to substantially cancel out the relative timing offset, such that the rate of change of the relative timing offset over time is reduced. The base station may therefore avoid instances of periodic synchronization which would have otherwise resulted in interference spikes.

The method may further comprise, initially: identifying a physical cell identifier conflict with the second base station; and determining if the physical cell identifier conflict is resolvable. As periodic synchronization is most problematic when two neighboring base stations share the same physical cell identifier, the method may further comprise the initial steps of determining if there is such a conflict and taking steps to avoid it (such as by changing the physical cell identifier value).

The method may further comprise adjusting the first periodic timing pulse by varying the timing of an instance of the periodic timing pulse such that the relative timing offset is varied. In doing so, the base station may reduce the likelihood of interference by reducing any instance of reference signals being transmitted at the same time.

There is also provided a computer program containing computer-executable code which, when executed on a computer, causes the computer to perform the steps of the method of the first aspect of the disclosure.

According to a second aspect of the disclosure, there is provided a first base station operating in a cellular network, the cellular network also including a second base station, the first base station comprising: an oscillator providing a reference frequency; a processor adapted to derive a first periodic timing pulse from the reference frequency; a transceiver adapted for transmission of a frame at instances of the first periodic timing pulse, and further adapted to measure a second periodic timing pulse of a second base station, wherein the processor is further adapted to: determine a relative timing offset between a first instance of the first periodic timing pulse and a first instance of the second periodic timing pulse; and determine that the relative timing offset is changeable; and to adjust the first periodic timing pulse to maintain the relative timing offset by varying a first period between instances of the first periodic timing pulses such that the rate of change of the relative timing offset over time is reduced.

The processor may be further adapted to: identify a physical cell identifier conflict with the second base station; and determine if the physical cell identifier conflict is resolvable.

The processor may be further adapted to: adjust the first periodic timing pulse by varying the timing of an instance of the periodic timing pulse such that the relative timing offset is varied.

BRIEF DESCRIPTION OF THE DRAWINGS

In order that the present disclosure may be better understood, embodiments thereof will now be described, by way of example only, with reference to the accompanying drawings in which.

DETAILED DESCRIPTION OF EMBODIMENTS

Figure 1:
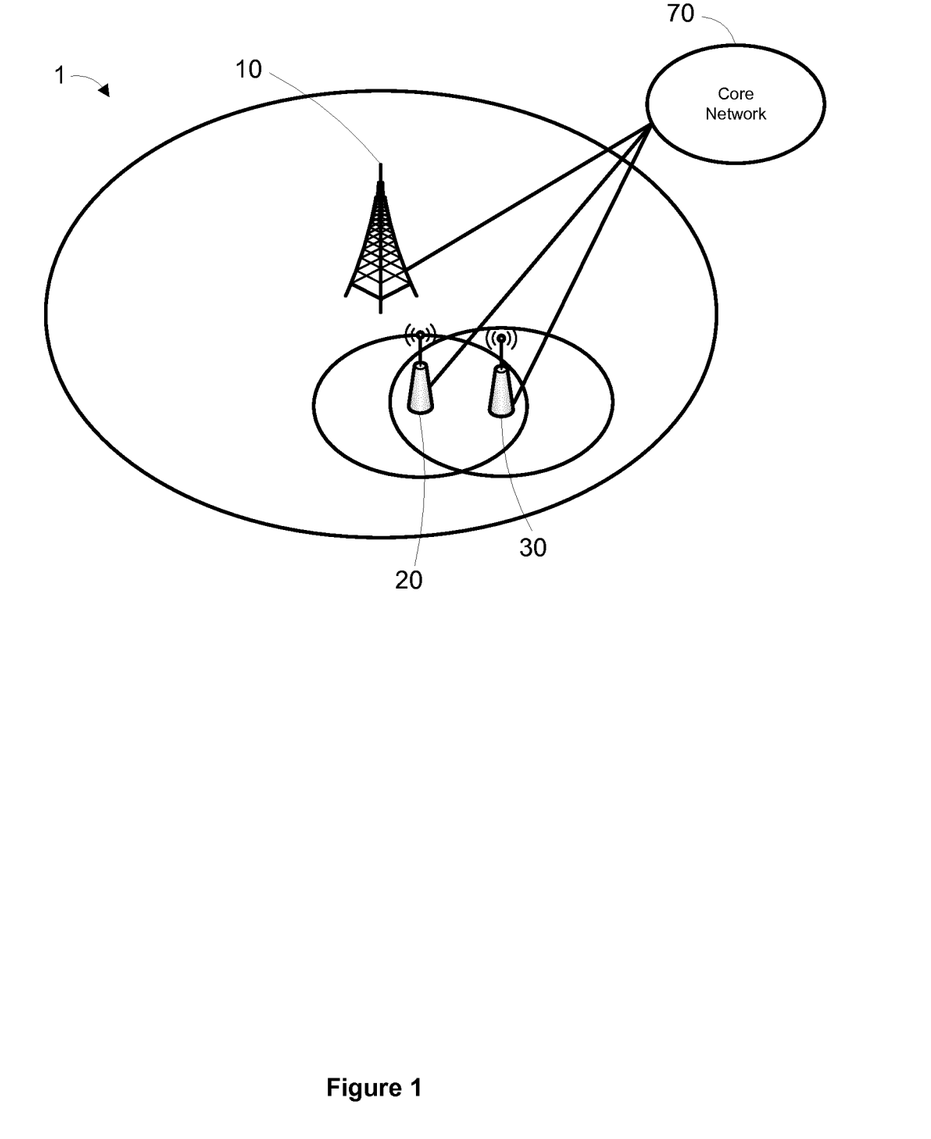
FIG. 1 is a schematic diagram of a cellular telecommunications network of an embodiment of the present disclosure.

A first embodiment of a cellular communications network 1 of the present disclosure will now be described with reference to FIGS. 1 to 3. As shown in FIG. 1, the cellular communications network 1 includes a macro base station 10, and a first and second femto base station (hereinafter known as the first and second HeNB) 20, 30. The macro base station 10 and first and second HeNBs 20, 30 are connected via respective backhaul connections to a Core Network (CN) 70, which includes various modules of the Mobile Network Operator (MNO) such as the Mobility Management Entity and the Accounting, Authentication and Authorization entity, and includes onward connections to external networks such as the Internet.

Figure 2:
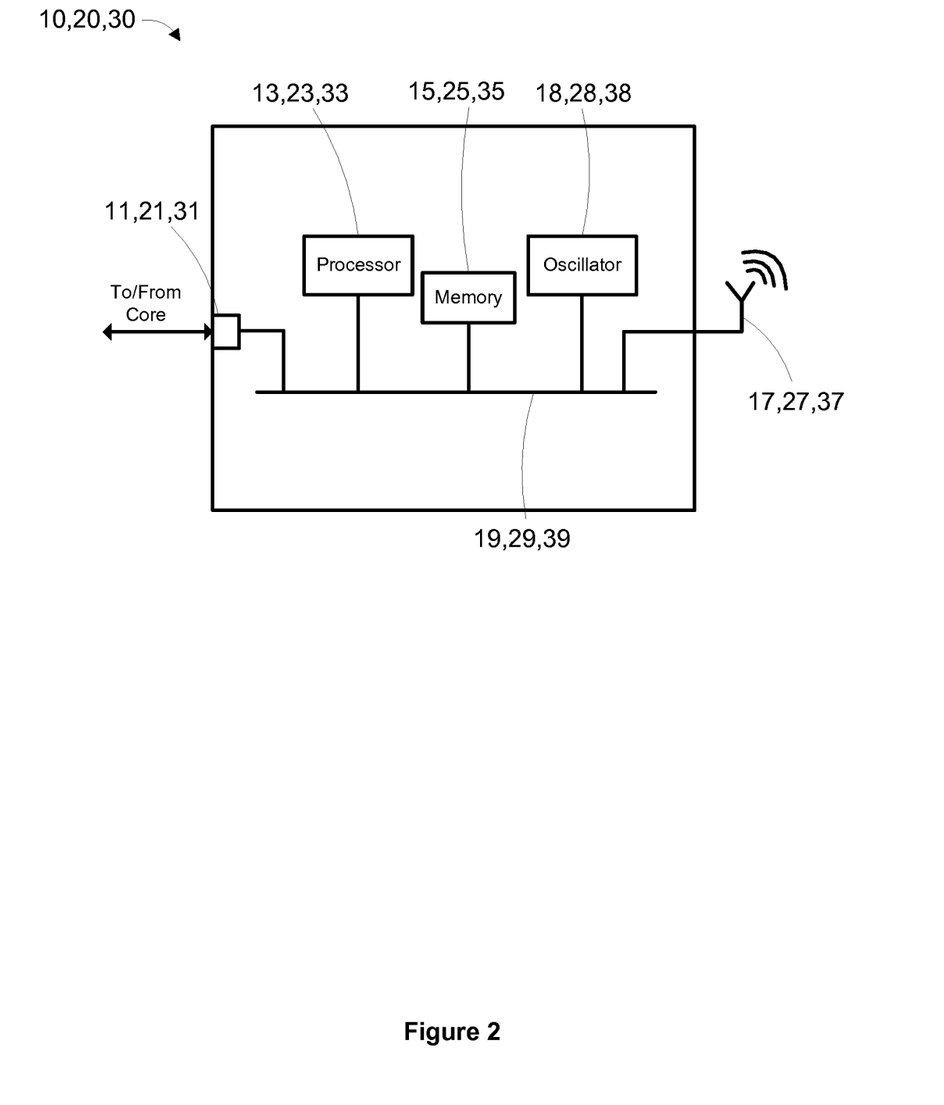
FIG. 2 is a schematic diagram of a base station of the network of FIG. 1.
Figure 3:
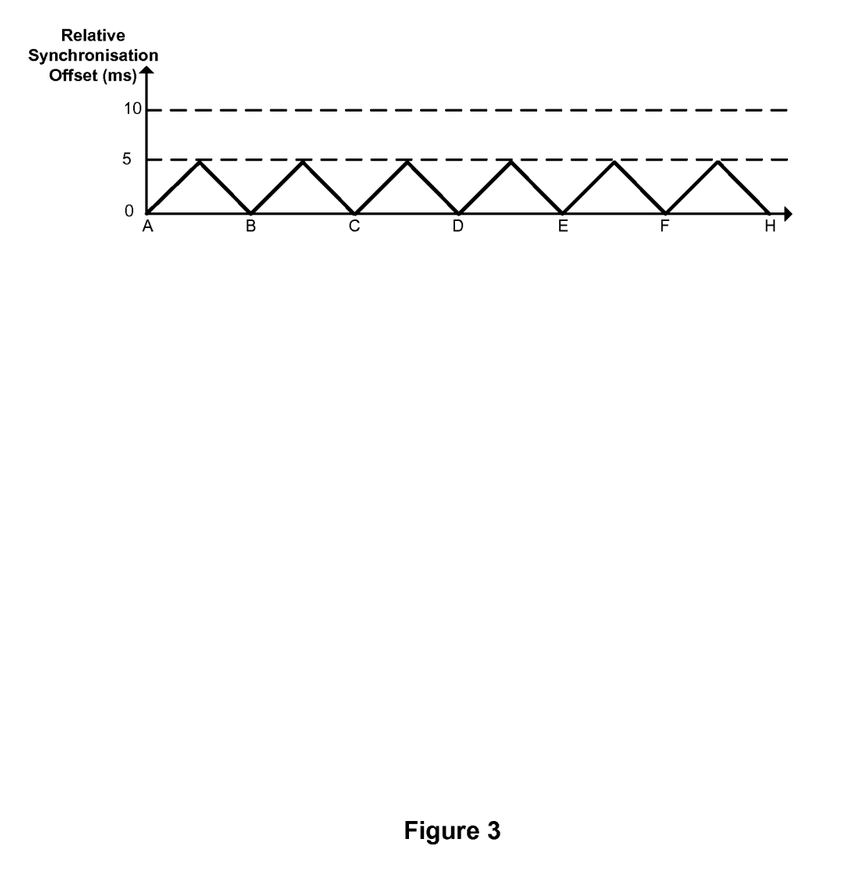
FIG. 3 is a graph illustrating the synchronization offset between two base stations of the network of FIG. 1.

A schematic diagram illustrating the macro base station 10 and the first and second HeNBs 20, 30 is shown in FIG. 2. The skilled person will understand that there may be several physical differences between the construction of a macro base station and a HeNB, but FIG. 2 illustrates the various constituent parts of each which may be of a particular form depending on the deployment scenario. The macro base station 10 and first and second HeNB 20, 30 each include a first transceiver 11, 21, 31, a processor 13, 23, 33, memory 15, 25, 35, a second transceiver 17, 27, 37, and an oscillator 18, 28, 38, all connected via bus 19, 29, 39. The first transceivers 11, 21, 31 are commonly known as the backhaul connection and are used for transmissions to and from the CN 70, which would be a carrier-grade Ethernet or optical fiber connection for the macro base station 10 and typically a Digital Subscriber Line or optical fiber connection for the first and second HeNB 20, 30. The second transceivers 17, 27, 37 are antennae configured for cellular communications (in this embodiment, via the 4G LTE protocol) with connected User Equipment (UE). The processors 13, 23, 33 typically process data packets received via the first transceivers 11, 21, 31 or second transceivers 17, 27, 37 such that they are in a form to be transmitted to their destination (for example, IP data packets received at the first transceiver 11 of the macro base station 10 from the CN 70 may be processed into Transport Blocks (TBs) by the processor 13 for onward transmission to a UE via the second transceiver 17, which may be temporarily stored in a buffer in memory 15).

The oscillators 18, 28, 38 provide the macro base station 10 and first and second HeNB 20, 30 with a periodic oscillating signal. These can be converted by the respective processors 13, 23, 33 into periodic oscillating signals of a particular frequency in order to operate the second transceivers 17, 27, 37 within the operating frequencies of the 4G LTE protocol. Furthermore, the processors 13, 23, 33 may derive a periodic timing pulse from the periodic oscillating signals of the oscillators 18, 28, 38 (e.g. producing a periodic signal every 10 ms) which provides the timing instances for transmissions of a sequence of frames from the second transceivers 17, 27, 37.

It is known that oscillators are imperfect and any two oscillators drift away from a desired reference frequency over time. In LTE, the maximum error of the oscillator is ±250 ppb for femto base stations (such as the first and second HeNB 20, 30), which translates to an error of ±650 Hz from a centre frequency of 2.6 GHz. This means that the fastest and slowest oscillators would be out by 1300 pulses per second with a 0.5 nanosecond pulse interval. The maximum rate of change of a relative time offset between timing pulses of any two base stations is therefore 0.650 microseconds (or 0.00065 ms) per second. As the frame period in LTE is 10 ms, two base stations having oscillators operating at these opposing maxima may synchronize every 15384.6 s (10 ms divided by 0.00065 ms) or 4 hours, 16 minutes, and 24.6 seconds.

In this embodiment, the macro base station 10 and the first and second HeNBs 20, 30 are configured to perform Radio Environment Monitoring (REM) scans of their respective environments via their second transceivers 17, 27, 37, and the results of these are stored in memory 15, 25, 35 together with a timestamp of the respective scan. These REM scans will be described in more detail below.

In this embodiment, the first and second HeNBs 20, 30 are not continuously synchronized due to the two HeNBs 20, 30 having relative clock drifts (i.e. a second as recorded on the first HeNB 20 is not equal to a second as recorded on the second HeNB 30). The resulting time offset between frames transmitted by the first and second HeNBs 20, 30 is shown in the graph of FIG. 3. As shown in the graph, the time offset between the first and second HeNB 20, 30 varies over time. At point A on FIG. 3 a frame from the first HeNB 20 has no time offset relative to a frame from the second HeNB 30 and hence they are transiently synchronized. However, following point A, the time offset for each subsequent frame from the first HeNB 20 relative to a corresponding frame of the second HeNB 30 increases up to 5 ms. At this point, the time offset of a frame from the first HeNB 20 relative to a corresponding frame of the second HeNB 30 is the same as the time offset relative to an immediately-adjacent frame of the second HeNB 30. Following this intermediate point, the time offset for each subsequent frame decreases down to 0 (at point B), at which point the time offset of a frame from the first HeNB 20 is aligned with the corresponding frame from the second HeNB 30. Accordingly, the time offset between transmissions of the first and second HeNBs 20, 30 vary in a triangular fashion between the various points A to H. The skilled person will understand that the time offset between the first and second HeNB 20, 30 may be more complicated than that depicted in FIG. 3, but the above example is used for simplicity.

At points A to H there is no time offset between transmissions from the first and second HeNBs 20, 30. Accordingly, there may be significant interference between their transmissions. This may depend on other factors (such as there being a clear propagation pathway between the two HeNBs 20, 30), but if these conditions are met then any connected UEs would experience a severe drop in service. However, in between any two points A to H in FIG. 3 when there is a time offset between the two HeNBs 20, 30, then there is significantly less interference between their transmissions.

In this embodiment of the disclosure, the first and second HeNB 20, 30 are configured to determine that they have a periodic synchronization with a neighboring base station and measure properties of this periodicity in order to force themselves into a constant state of non-synchronization. The result of this action is to reduce the occurrences of transient synchronization and interference. This may be achieved by implementing a method of the present invention, an embodiment of which will now be described with reference to FIG. 4.

Figure 4:
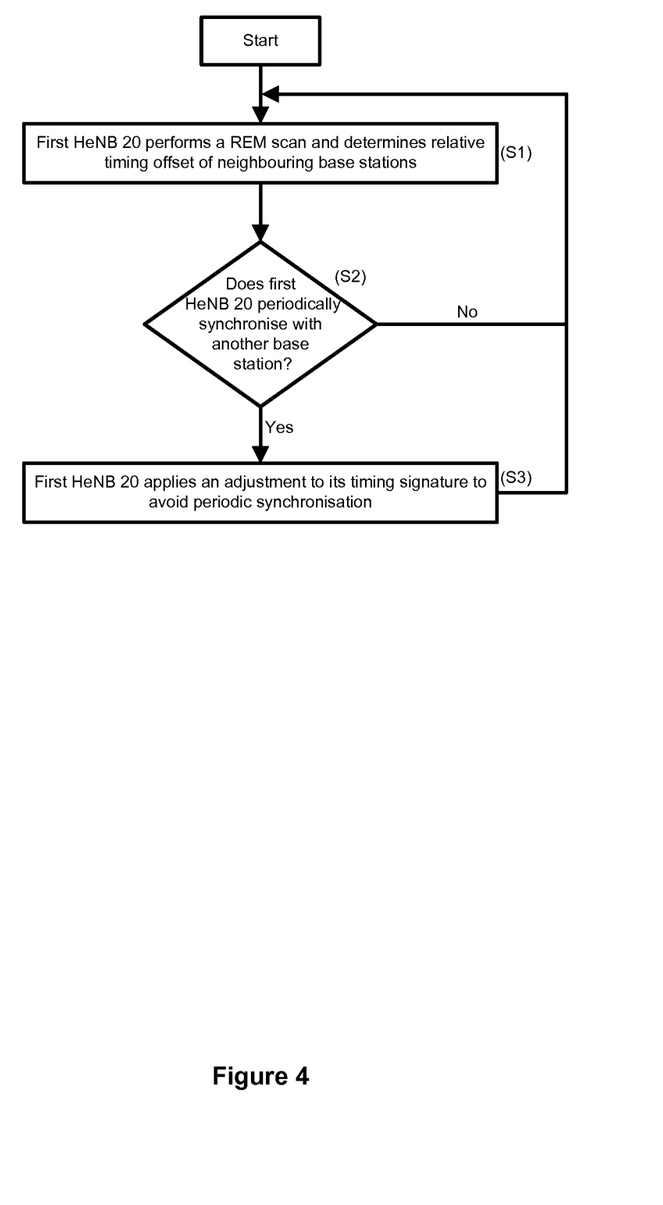
FIG. 4 is a flow diagram illustrating an embodiment of a method of the present disclosure.

In the method at S1, the first HeNB 20 performs a REM scan of its neighboring environment. In doing so, the first HeNB 20 stops serving its connected UEs and listens to the downlink channels of neighboring base stations (i.e. base stations having coverage areas in which the first HeNB 20 resides) in order to collect certain information. Accordingly, the first HeNB 20 decodes the Primary and Secondary Synchronization Signals (PSS, SSS) of all neighboring base stations. In this embodiment, the first HeNB 20 decodes at least two pieces of information. Firstly, the first HeNB 20 decodes the Physical Cell Identifier (PCI) of each neighboring base station. This is derived from the PSS and SSS signals in a manner known in the art. Secondly, the first HeNB 20 determines the timing signature of transmissions from each neighboring base station from the PSS and SSS signals. This timing signature is a periodic timing pulse used by the second HeNB 30 having a periodicity of approximately 10 ms and may have a relative timing offset with respect to the periodic timing pulse used by the first HeNB 20 (i.e. a single instance of a timing pulse from one base station occurs at a different time to a single instance of a timing pulse from another base station). The relative timing offset between the timing signature of the first HeNB 20 and any neighboring base station can be determined by comparing the start of its own frame with one from a neighboring base station. Although there may be some time delay between an instance of a periodic timing pulse and the timing of a frame transmission, nonetheless the first HeNB 20 is able to derive the relative timing offset of the timing pulses as the measured relative timing offset between frame transmissions).

Accordingly, in the present example, the first HeNB 20 determines that there are two neighboring base stations—the macro base station 10 and the second HeNB 30. The first HeNB 20 then determines the PCI and the relative timing offset of these neighboring base stations, and records them in memory 25 together with a timestamp of the measurement. An example of this data is shown in the following table:

TABLE 1

A table illustrating information recorded by the first HeNB 20

| Neighboring base station | PCI | Relative Timing Offset (ms) | Timestamp of Measurement |
|---|---|---|---|
| Macro base station 10 | PCI 1 | 0 | 2015-12-30 15:41:52.23912 |
| Second HeNB 30 | PCI 2 | +2.01 | 2015-12-30 15:41:52.23912 |

In this example, the first HeNB 20 also uses PCI 2, and therefore has a PCI collision with the second HeNB 30. However, at the time of measurement, there would be no significant interference between the first HeNB 20 with either the second HeNB 30 or the macro base station 10. That is, the first HeNB 20 and macro base station 10 have different PCI values, so there would be insignificant interference between their respective transmissions even though they are synchronized. Furthermore, the first HeNB 20 and second HeNB 30 have a relative timing offset, such that interference is insignificant despite the PCI collision. However, as noted above, transmissions from the first and second HeNB 20, 30 could experience significant increases in interference if there is a relative clock drift resulting in a common periodic timing pulse at a later time (i.e. the two HeNBs are periodically synchronized).

Figure 5:
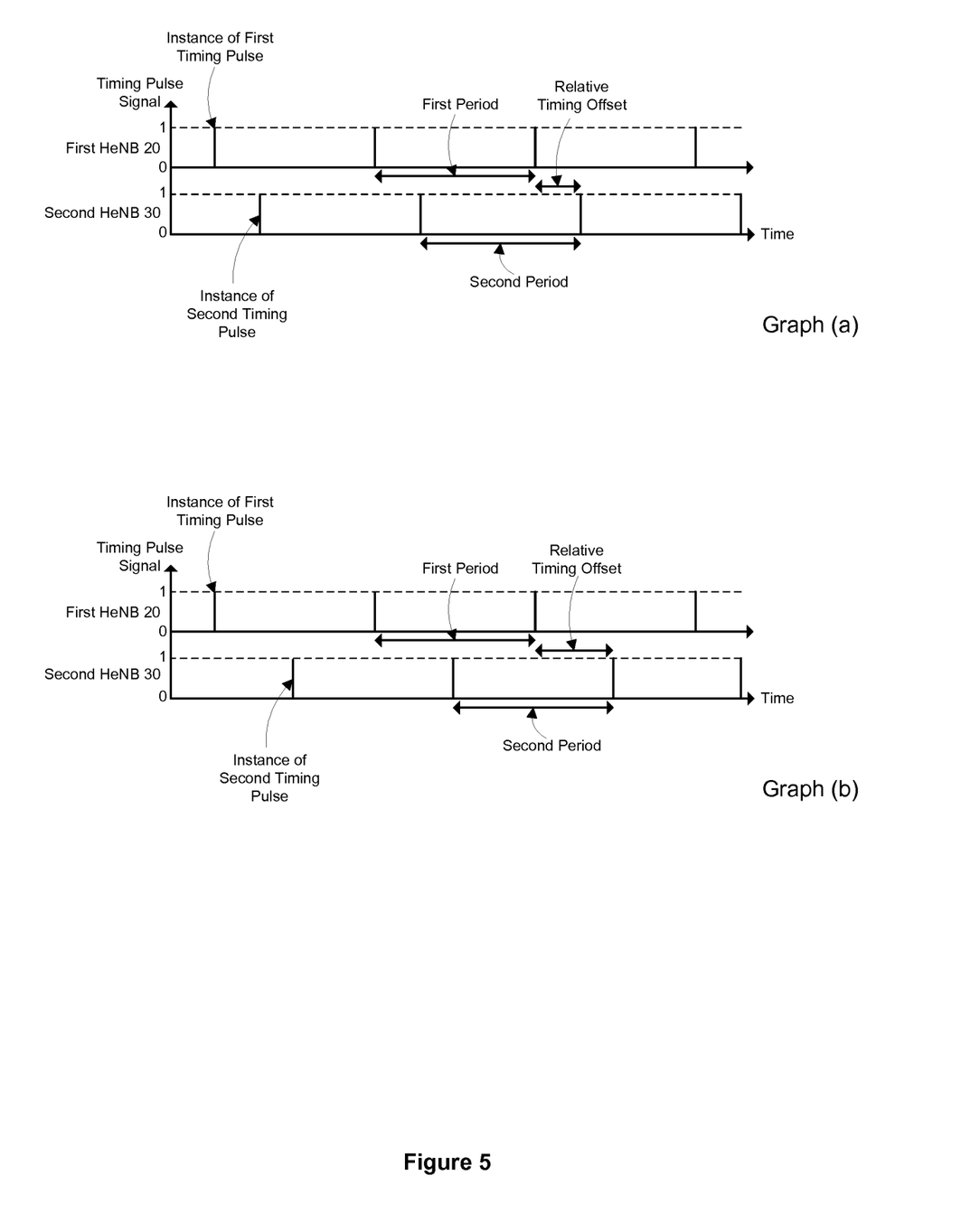
FIG. 5 includes two graphs illustrating the change in relative time offset over time between a first and second timing pulse of two base stations of the network of FIG. 1.

The relative timing offset between the first and second HeNB 20, 30 in this example is shown in the top graph (a) of FIG. 5. In graph (a), several timing pulses of the first and second HeNB 20, 30 are shown and the relative timing offset is the time between any two of these instances. Also shown is the first and second periods between timing pulses of the first and second HeNB 20, 30, which are both approximately 10 ms.

Returning to FIG. 4, in S2 of this embodiment of the present disclosure, the first HeNB 20 determines if the recorded information regarding the neighboring base station indicates that it is periodically synchronizing with a neighboring base station having a conflicting PCI. In this example following a single REM scan, this is not yet possible. Accordingly, the method loops back to S1 for a further REM scan. In this example, the second REM scan takes place exactly three hours and twenty minutes after the first REM scan.

Following a second REM scan, the first HeNB 20 is able to determine whether there has been any change in the relative timing offset between its own periodic timing pulse and that of the second HeNB 30, and thus if there is a periodicity of synchronization between the two. Following the second REM scan, the first HeNB 20 records the PCI and the relative timing offset of its neighboring base stations, and records them in memory 25 together with a timestamp of the measurement. This is illustrated in Table 2 below.

TABLE 2

Table illustrating information recorded by the first HeNB 20 in the second REM scan.

| Neighboring base station | PCI | Relative Timing Offset (ms) | Timestamp of Measurement |
| --- | --- | --- | --- |
| Macro base station 10 | PCI 1 | 0 | 2015-12-30 19:01:52.23912 |
| Second HeNB 30 | PCI 2 | +4.41 | 2015-12-30 19:01:52.23912 |

As shown in the above table, the relative timing offset between the first and second HeNBs 20, 30 has drifted by +2.4 ms in the three hours and twenty minutes between the first and second REM scan. This is shown graphically in graph (b) of FIG. 5, which again illustrates several instances of the first and second timing pulses for the first and second HeNBs 20, 30, and their respective time periods and relative timing offset. As can be seen by comparing graphs (a) and (b), the relative timing offset has shifted substantially in the intervening three hours and twenty minutes.

The first HeNB 20 calculates the relative clock drift between the first and second timing pulses of the first and second HeNBs 20, 30, as +2.4 ms divided by 12,000 seconds (i.e. 200 minutes×60 seconds), which equals +0.0002 ms. The first HeNB 20 is also able to calculate the periodicity of synchronization based on the calculated clock drift and the frame period (10 ms in LTE). In this example, the periodicity of synchronization is 10 ms divided by 0.0002 ms, which equals 50,000 seconds (or 13 hours, 53 minutes, and 20 seconds). Thus, every 50,000 seconds, transmissions from the first HeNB 20 and second HeNB 30 may experience significant interference as their transmissions transiently synchronize.

Returning to FIG. 4, in the second iteration of S2 of the above method, the first HeNB 20 therefore determines that there is a periodicity of synchronization between the first and second HeNBs 20, 30, and the process therefore moves to S3. In S3, the first HeNB 20 applies an adjustment to the first period of the first timing pulse such that each timing pulse occurs −0.0002 ms earlier than if the adjustment had not been made. This therefore cancels out the previous relative clock drift between the two HeNBs of +0.0002 ms. Future transmissions by the first and second HeNBs 20, 30 may now maintain a relative timing offset, rather than becoming periodically synchronized, thus reducing periodic spikes in interference in the network.

The process then loops back to S1 and a further REM scan is performed. In the example network above (in which there is only the macro base station 10 and second HeNB 30), the first HeNB 20 continues to monitor the relative timing offset in the event that it again begins to increase. In which case, the first HeNB 20 may make periodic timing adjustments to its periodic timing pulse in order to maintain a relative timing offset. Furthermore, the periodic REM scans will also identify any further neighboring base stations which may appear over time, and the first HeNB 20 can determine if a timing adjustment is appropriate in this case.

The above embodiments are based on a cellular network having three base stations, of which two had the same PCI value. It is also possible for a base station to have many more neighbors, and for a REM scan to identify more than one neighbor having a conflicting PCI value. For example, in a subsequent REM scan the first HeNB 20 identifies another base station, a third HeNB, that has now joined the network 1. The third HeNB also has PCI 2 and has a relative timing offset relative to both the first HeNB 20 and second HeNB 30. In this case, the first HeNB 20 may calculate (following another REM scan) two adjustments to make to its own timing period of its timing pulse—one adjustment in order to cancel out the relative clock drift with the timing pulse of the second HeNB 30 and another adjustment in order to cancel out the relative clock drift with the timing pulse of the third HeNB. The first HeNB 20 must select one of these adjustments to make. However, there is a chance the first HeNB 20 may apply an adjustment to one of its neighbors, only for that neighbor to apply its own adjustment to its own timing pulse (e.g. by independently practicing this embodiment) which would most likely result in the two neighbors maintaining a relative clock drift. To mitigate this problem, the first HeNB 20 may use any one or a combination of the following techniques:

The first HeNB 20 may implement a random back-off timer between iterations of the method (i.e. between S4 and S1), such that all measurements and adjustments by each base station are performed at different times. This reduces the likelihood of two base stations making adjustments at the same time;

The first HeNB 20 may make several measurements of the relative clock drift with its neighbors before it determines that an adjustment should be made. By making several measurements, the first HeNB 20 may determine if the neighboring base station has already made its own adjustment by identifying a substantial reduction in any measured clock drift. The number of measurements could also be random to again reduce the likelihood of two base stations making adjustments at the same time;

The first HeNB 20 may apply an adjustment only based on a neighbor with which it has a relative timing offset greater than a threshold;

The first HeNB 20 makes the adjustment immediately after determining that an adjustment should be made. This reduces the time window in which two neighboring base stations may independently determine that an adjustment should be made and then make that adjustment.

In the above embodiment, once the adjustment to the period of the timing pulse has been made, the relative timing offset is thereafter set to the particular value at the time the adjustment is made (e.g. +4.403 in the example above, assuming the adjustment is applied immediately following the measurement). An enhancement to the above embodiment will now be described. In this enhancement, the first HeNB 20 not only performs an adjustment to the period of the timing pulse in order to maintain a relative timing offset, but also applies an advance or delay to the next instance of the timing pulse in order to maintain the relative timing offset at a particular value. In other words, the first HeNB 20 adjusts the timing of an instance of the first timing pulse such that the relative timing offset between instances of the first and second timing pulse is varied. In an example, the first HeNB 20 delays its next timing pulse by 0.597 ms such that the new relative timing offset is 5 ms (i.e. half the frame period in LTE). Furthermore, any neighboring base station may also be able to recognize that the first HeNB 20 has made an adjustment to the period of its periodic timing pulse by identifying such a shift in a single instance of the timing pulse, which could be used as an indicator that the neighbor should not make its own adjustment.

Furthermore, following S1 of the above embodiments in which the first HeNB 20 performs a REM scan of its neighboring base stations, the first HeNB 20 may also implement checking whether the PCI conflict is resolvable. If so, then one of the PCI values may be changed. If not (e.g. there are no PCI values available), then the first HeNB 20 may practice the remaining steps of the method.

The skilled person will understand that it is non-essential for the new relative timing offset to be half of the frame period for the particular transmission protocol. In other embodiments, the next frame for transmission could be advanced/delayed in order to maintain a relative timing offset that maximizes the distance between reference signals, or in another example, the transmission advance/delay could be randomized (with a potential extra check that the advance/delay does not inadvertently result in synchronization with a neighboring femtocell with which it has a PCI conflict).

In the above embodiments, the first HeNB 20 determines if the information obtained in the REM scan indicates that it is periodically synchronizing with a neighboring base station with which it has a conflicting PCI. However, the present disclosure may also be used to reduce any form of PCI value related interference, such as when two neighboring base stations have different PCI values but which still cause interference issues due to overlapping reference signals. This may happen, for example, when the two neighbors' respective PCI values and antenna configurations result in reference signals being transmitted using the same time and frequency resources (known as modulo, or "mod", 3, 6, or 30 issues). Accordingly, in an enhancement to the above embodiments, the first HeNB 20 performs a REM scan of its radio environment and records, for each neighboring base station, its relative timing offset, a timestamp of the measurement, and a flag indicating whether or not its transmission may significantly interfere with transmissions from that neighbor (e.g. due to a PCI conflict or due to a mod 3/6/30 issue). The first HeNB 20 may then determine if it periodically synchronizes with any of these flagged neighbors and make suitable adjustments to the period of its timing pulse.

The skilled person will understand that the relative timing offset between the timing pulses of the neighboring base stations will change due to imperfect oscillators being used. Accordingly, it is highly unlikely that the adjustment made by a base station using the method of the present invention will eliminate all future clock drift. However, the adjustment made by the base station will reduce the rate of change of the relative timing offset between the two timing pulses over time.

In a further enhancement, S2 of the above embodiment (in which the base station determines whether the relative timing offset with a neighboring base station with which it has a PCI conflict is changeable such that it has a periodic synchronization) may further determine whether the rate of change of the relative timing offset is above or below a threshold. This threshold may be set such that, if the relative timing offset is below it, then instances of periodic synchronization would be so infrequent that an adjustment is not necessary (it may also indicate that an adjustment in order to maintain a relative timing offset would be beyond the accuracy of the oscillator). Thus, if the change in relative timing offset is below this threshold, the process can return to S1, and if the change is above this threshold, the process can proceed to S3.

The skilled person will also understand that the present disclosure may be applied to two base stations of any form, such as between two macro base stations, between a macro base station and (any form of) a small cell, or between two small cells (of any two forms). Although the accuracy of the two oscillators in each base station may differ based on their form, the present disclosure may still be used to maintain a relative time offset between their timing pulses.

The skilled person will understand that any combination of features is possible within the scope of the invention, as claimed.

The invention claimed is:

1. A method of operating a first base station in a cellular network, the cellular network also including a second base station, wherein the first and second base stations include first and second oscillators providing a first and second periodic timing pulse respectively, the method comprising:

determining a relative timing offset between a first instance of the first periodic timing pulse for transmission of a frame from the first base station and a first instance of the second periodic timing pulse for transmission of a frame from the second base station;

determining a change in the relative timing offset; and, in response, adjusting the first periodic timing pulse to maintain the relative timing offset by varying a first period between instances of the first periodic timing pulse such that a rate of change of the relative timing offset over time is reduced.

2. The method as claimed in claim 1, further comprising: determining if there is a Physical Cell Identifier (PCI) related interference issue with the second base station.

3. The method as claimed in claim 2, wherein the PCI related interference issue is due to the first and second base stations having the same PCI value.

4. The method as claimed in claim 2, wherein the PCI related interference issue is due to the first and second base stations having PCI values which are different but result in overlapping reference signals in their respective transmissions.

5. The method as claimed in claim 1, further comprising, initially:
identifying a physical cell identifier conflict with the second base station; and
determining that the physical cell identifier conflict cannot be resolved.

6. The method as claimed in claim 1, further comprising: adjusting the first periodic timing pulse by varying a timing of an instance of the periodic timing pulse such that the relative timing offset is varied.

7. A non-transitory computer-readable storage medium storing a computer program containing computer-executable code which, when executed on a computer, causes the computer to operate a first base station in a cellular network, the cellular network also including a second base station, wherein the first and second base stations include first and second oscillators providing a first and second periodic timing pulse respectively, by:
determining a relative timing offset between a first instance of the first periodic timing pulse for transmission of a frame from the first base station and a first instance of the second periodic timing pulse for transmission of a frame from the second base station;
determining that the relative timing offset is changeable; and, in response,
adjusting the first periodic timing pulse to maintain the relative timing offset by varying a first period between instances of the first periodic timing pulse such that a rate of change of the relative timing offset over time is reduced.

8. A first base station operating in a cellular network, the cellular network also including a second base station, the first base station comprising:
an oscillator providing a reference frequency;
a processor configured to derive a first periodic timing pulse from the reference frequency;
a transceiver configured for transmission of a frame at instances of the first periodic timing pulse, and further configured to measure a second periodic timing pulse of the second base station,
wherein the processor is further configured to:
determine a relative timing offset between a first instance of the first periodic timing pulse and a first instance of the second periodic timing pulse,
determine a change in the relative timing offset, and
to adjust the first periodic timing pulse to maintain the relative timing offset by varying a first period between instances of the first periodic timing pulses such that a rate of change of the relative timing offset over time is reduced.

9. The first base station as claimed in claim 8, wherein the processor is further configured to:
determine if there is a Physical Cell Identifier (PCI) related interference issue with the second base station.

10. The first base station as claimed in claim 9, wherein the PCI related interference issue is due to the first and second base stations having the same PCI value.

11. The first base station as claimed in claim 9, wherein the PCI related interference issue is due to the first and second base stations having PCI values which are different but result in overlapping reference signals in their respective transmissions.

12. The first base station as claimed in claim 8, wherein the processor is further configured to:
identify a physical cell identifier conflict with the second base station; and
determine that the physical cell identifier conflict cannot be resolved.

13. The first base station as claimed in claim 8, wherein the processor is further configured to:
adjust the first periodic timing pulse by varying a timing of an instance of the periodic timing pulse such that the relative timing offset is varied.

* * * * *